Aug. 11, 1959

L. G. HILKEMEIER 2,899,197

SUPPORT STRUCTURE FOR A WELDING POSITIONER

Filed Jan. 17, 1957

LOUIS G. HILKEMEIER
*INVENTOR.*

Aug. 11, 1959  L. G. HILKEMEIER  2,899,197
SUPPORT STRUCTURE FOR A WELDING POSITIONER
Filed Jan. 17, 1957  2 Sheets-Sheet 2

LOUIS G. HILKEMEIER
INVENTOR.
BY Daniel A. Bobis
Atty

2,899,197

Patented Aug. 11, 1959

2,899,197
SUPPORT STRUCTURE FOR A WELDING POSITIONER

Louis G. Hilkemeier, Plainfield, N.J., assignor to Worthington Corporation, Harrison, N.J., a corporation of Delaware Application January 17, 1957, Serial No. 634,706

1 Claim. (Cl. 269—204)

The present invention relates to an improved support structure for a welding positioner of the type having operable means for rotating and tilting an article mounted thereon so that the article may be conveniently presented in any desired position for a welding operation.

In the prior art, support structures for welding positioners consist of a base support member which supports the operable means of the welding positioner at two or more spaced points. This design practice is followed to avoid tipping moments in the support structure which might be caused by the supported weight of the operable means. However, such a support structure is unduly complicated and expensive to manufacture because of these spaced plural points of support which must be incorporated therein to support the operable means.

In contrast to the above, the primary object of the present invention is to provide a simplified support structure which supports the operable means at only one point and which, in addition, maintains the center of gravity of the operable means, and articles mounted thereon, in a position of balance relative to the support structure.

This is accomplished in the present invention by supporting the operable means from one end of an elongated frame member slidably disposed on a vertical column in offset spaced relation thereto, so that the center of gravity of the operable means lies in the vertical plane substantially bisecting the medial portion of the column and substantially parallel to the frame member.

A more specific object of the present invention is to provide a simplified base to support the column and which, in addition, lends the necessary balanced support to the support structure.

The invention will be better understood when considered in connection with the accompanying specification and drawings forming a part thereof, in which.

The operable means

Figure 1:
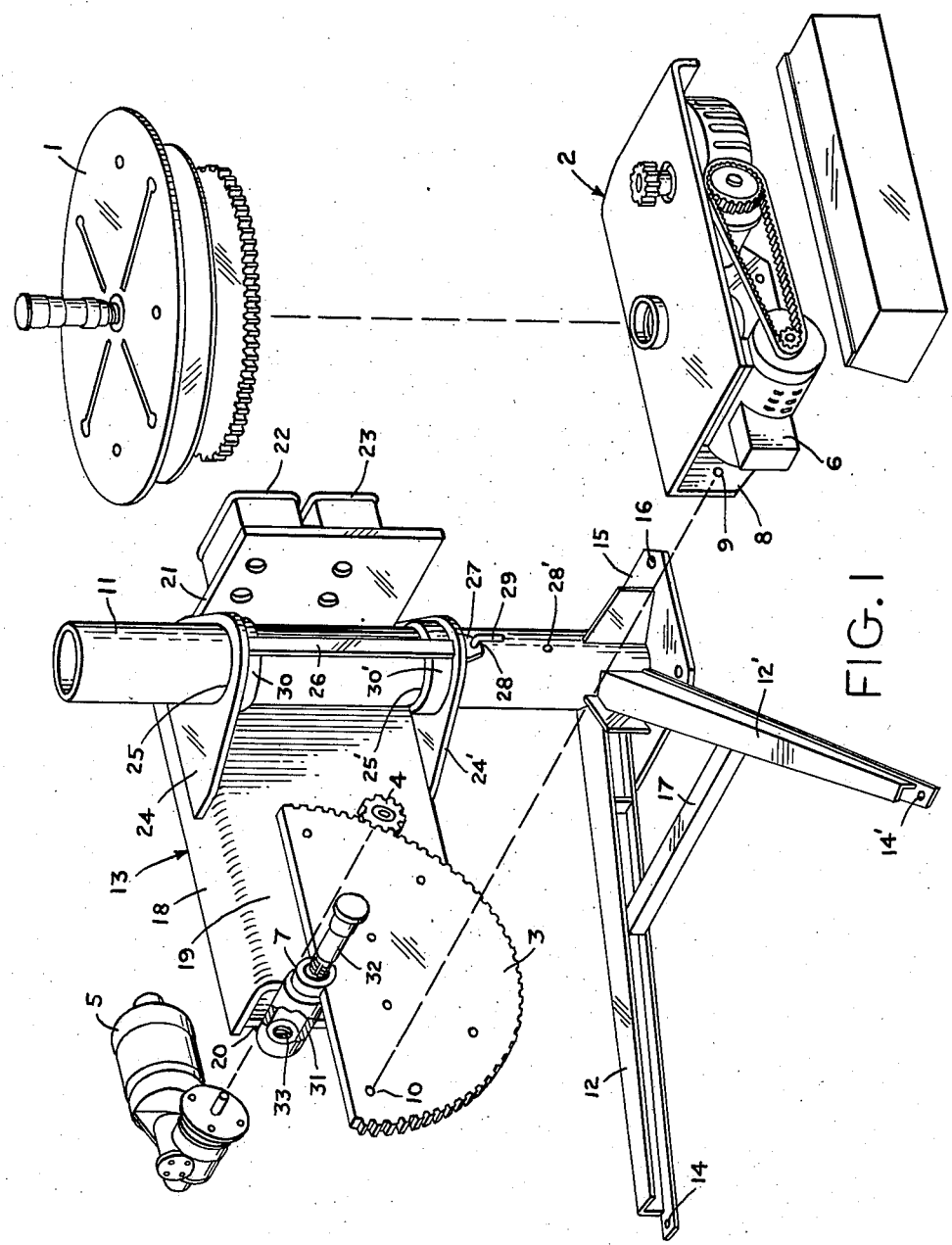
Figure 1 is an exploded view of a welding positioner having the simplified support structure of the present invention.
Figure 2:
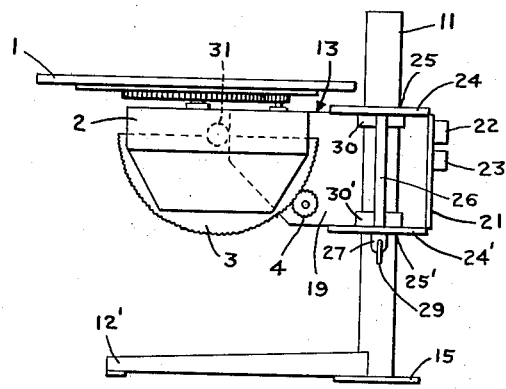
Figure 2 is a side of the assembled welding positioner.

In Figure 1, the operable means shown consists generally of a rotatable table 1, motor and gear arrangement generally designated 2, tilt segment 3, driving gear 4 and motor 5.

Table 1 is rotatably connected to arrangement 2 by any well known means so that when motor 6 of arrangement 2 is operative, table 1 will rotate. Motor 5 is connected to driving gear 4, which in turn is in engagement with teeth formed in the outer periphery of tilt segment 3, so that when motor 5 is operative, tilt segment 3 will pivot about a hollow shaft 7 connected to its center.

Yoke 8 and tilt segment 3 are provided with holes 9 and 10 respectively, which are so spaced in each respective element that when yoke 8 is positioned adjacent tilt segment 3, holes 9 and 10 are in alignment and any standard fastening means (not shown) can be disposed therethrough to form a connection.

When yoke 8 is thusly connected to tilt segment 3, any article to be welded (not shown) rigidly connected to table 1 by any well known means, is capable of being both rotated and tilted.

Elements of the support structure

The support structure for the operable means just described consists of a vertical post or column 11, base support elements or legs 12 and 12', and an L-shaped frame member generally designated 13.

The base legs 12 and 12' extend outwardly from a common vortex at the point of attachment to column 11 and are welded to each as well as to the column to insure a firm connection. Holes 14 and 14' are provided for bolting the legs to the floor. For this same purpose, a flat plate 15 having holes 16 in each of its four corners is welded to the bottom end of column 11. Cross bar 17 connected between legs 12 and 12' serves to make the legs more rigid.

Frame member 13 comprises an elongated plate whose long side portions 18 are bent perpendicularly of its medial portion 19 and a second elongated rectangular plate 20 welded to these side portions. A portion of frame member 13 designated 21 is provided to accommodate control boxes 22 and 23 which house the electrical controls for motors 5 and 6. However, it will be understood that since control boxes 24 and 25 can be mounted elsewhere, portion 21 can be eliminated from frame member 13 without detracting from the present invention.

At the connection of medial portion 19 and portion 21, a pair of spaced support plates 24 and 24' are provided having aligned openings 25 and 25' adapted to receive column 11 therethrough when frame member 13 is slidably disposed on column 11 as hereinafter described. The support plates are held in spaced relationship by a spacer element 26 which has a projection 27 having a bore 28 therethrough. When frame member 13 is disposed on column 11, bore 28 can be aligned with any of the plurality of holes 28' in column 11, so that a pin 29 can be disposed therethrough to set frame member 13 at any elevated position on column 11.

Collar members 30 and 30' attached respectively to support plates 24 and 24' about openings 25 and 25' are provided to insure a firmer fit of frame member 13 on column 11.

At the end of frame member 13 remote from support plates 24 and 24', welded to second rectangular plate 20 and medial portion 19 is a hollow bushing 31 which is adapted to receive hollow shaft 7 connected to the center of tilt segment 30 when shaft 7 is disposed therein, a pin 32 having a threaded end portion, is in turn disposed into the bore of shaft 7 and by engaging with an internally threaded portion 33 in bushing 31, holds the shaft in pivotal connection in the said bushing.

Assembly of the support structure and operable means

Column 11 with base legs 12 and 12' welded thereto is positioned so that column 11 is substantially vertical and legs 12 and 12' rest against the floor. If desired, bolts can be disposed through holes 14, 14' and the four holes 16 in plate 15 to rigidly connect column 11 and legs 12 and 12' to the floor.

L-shaped frame member 13 is then slidably disposed on column 11 by fitting column 11 through aligned openings 25 and 25' in spaced support plates 24 and 24' respectively. Frame member 13 is then rotated about column 11 until it extends outwardly from the same side of column 11 as do legs 12, and until in addition bore 28 in projection 27 is aligned with one of the plurality of vertically aligned holes 28'. When this is accomplished, pin 29 is inserted through bore 28 and hole 28' to set frame member 13 in an elevated position on column 11.

Tilt segment 3 is then set in operating condition on frame member 13 and hollow shaft 7 is inserted into bushing 31 and held in a pivotable connection in bushing 31 by pin 32. After table 1 is rotatably connected to arrangement 2, arrangement 2 is connected to tilt segment 3.

Figure 3:
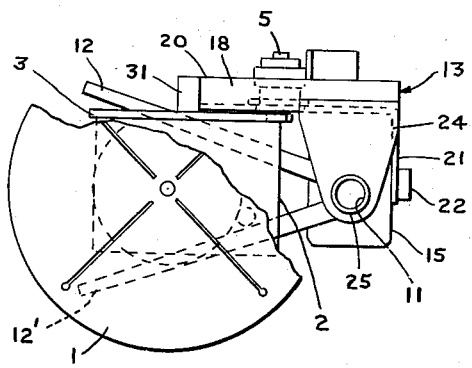
Figure 3 is a top view of the welding positioner shown in Figure 2.

Referring to Figure 3, it will be observed that in the assembled condition just described, that frame member 13 extends outwardly from the same side of column 11 as do legs 12 and 12', and in addition frame member 13 is in offset spaced relationship to column 11 to the extent of the length of support plates 24 and 24'. In this position, the center of gravity of the operable means supported by frame member 13 falls in the vertical plane which bisects the medial portion of column 11 and the angle formed between legs 12 and 12' and which in addition is parallel to the medial portion 19 of frame member 13. As a consequence, base legs 12 and 12' are capable of counterbalancing any tipping movement induced by the supported weight of the operable means.

It will be understood that the invention is not to be limited to the specific construction or arrangement of parts shown, but that they may be widely modified within the invention defined by the claim.

What is claimed is:

A support structure for a welding positioner comprising a column held upright by a pair of diverging legs connected to the base of said column, a frame having two spaced horizontal and two spaced vertical sides connected at right angles to each other, a pair of plates connected to said horizontal sides of said frame at one end thereof and extending laterally of said frame, said pair of plates having aligned openings therein for slidably mounting said frame on said column parallel to and horizontally displaced from the vertical plane bisecting the angle of said diverging legs and passing through the axis of said column, and at the other end of the frame a horizontally disposed cylindrical bushing extending laterally of said frame and connected to the ends of said vertical sides of said frame and adapted to carry the work positioning mechanism of the welding positioner.

References Cited in the file of this patent

UNITED STATES PATENTS

| | | |
|---|---|---|
| 935,834 | Bates et al. | Oct. 5, 1909 |
| 2,318,791 | Mueller | May 11, 1943 |
| 2,477,169 | Brekelbaum | July 26, 1949 |